Dec. 9, 1947. P. W. JOHNSON 2,432,160
SCREW THREAD ANALYZER GAGE
Filed Aug. 17, 1943
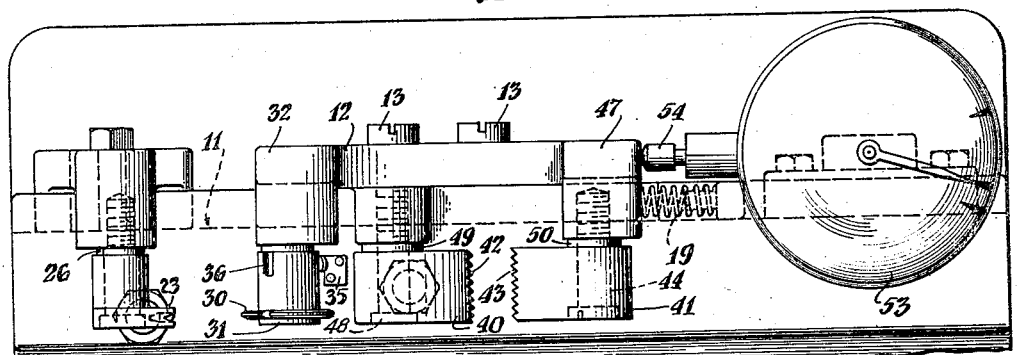
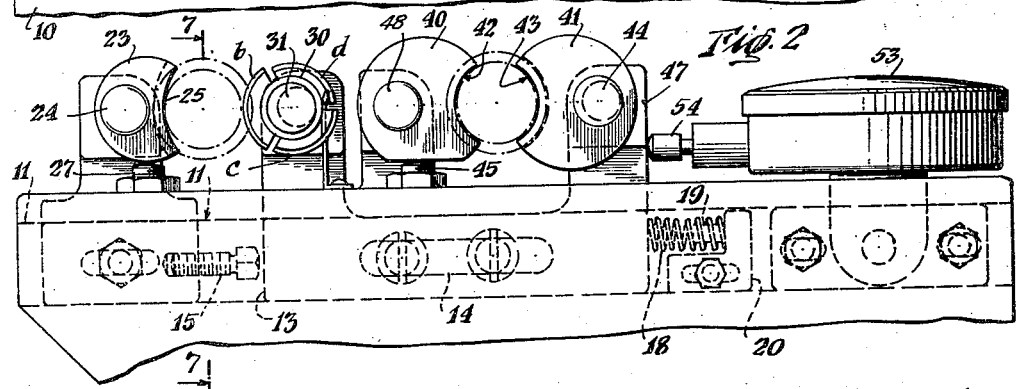
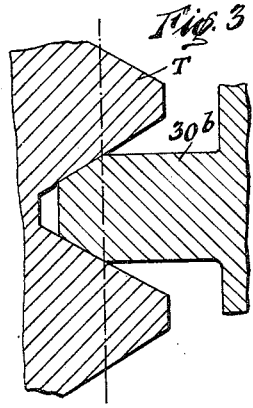
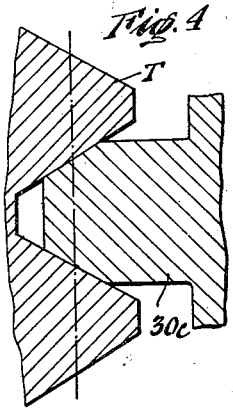
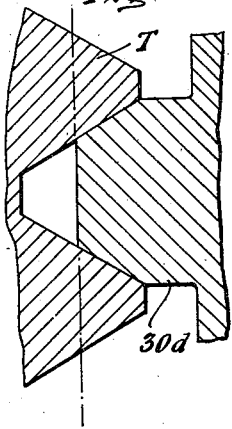
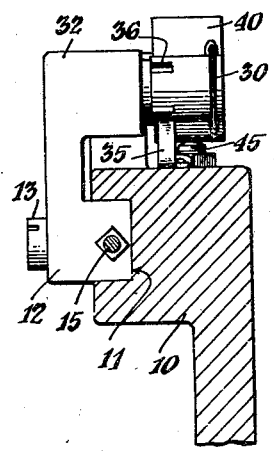
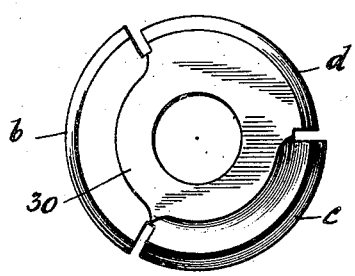
INVENTOR.
Paul W. Johnson
BY
Bohleber, Jassett & Montstream
ATTORNEYS Patented Dec. 9, 1947

2,432,160

UNITED STATES PATENT OFFICE 2,432,160

SCREW THREAD ANALYZER GAGE

Paul W. Johnson, Hartford, Conn.

Application August 17, 1943, Serial No. 499,030

6 Claims. (Cl. 33—199)

The invention relates to an analyzer or analyzing gage for use particularly in testing screw threads. The usual manner in which a screw thread is tested is to gage the pitch diameter and the pitch. With no further test than pitch and pitch diameter, there could be many defects existing in the thread affecting its assembly-ability and efficiency with a nut or threaded hole which defects would not be detected or if detected, the inspector would not know which, of the many defects occurring in screw threads, was present in the test part. Some of the thread deformities which exist are a wide angle thread or a narrow angle thread or a thread with insufficient usable depth or a defective profile. Sometimes these defects are ascertained with a simple test for pitch diameter but more often the test will indicate that the thread is defective but not in what particular respect. The thread analyzer described herein will indicate in what respect a thread may be defective.

An object of the invention is to construct a gage which utilizes a single gaging member to analyze a groove or part to be tested by testing different portions thereof.

An object of the invention is to construct a thread analyzer which will test a thread for two or more particular thread defects.

Another object of the invention is to construct a thread analyzer or analyzing gage which will test for two or more defects in the thread and give an indication as to the extent or degree of defect.

Another object is to construct a thread analyzer using a plurality of pairs of sets of gaging elements which are correlated so that a single indicator may be used to test a part in each of a plurality of sets of gaging members.

Another object is to construct a gaging means which will test a part or particularly a single thread groove at a plurality of points.

Other objects of the invention will be more apparent from the following description taken in connection with the accompanying drawings illustrating a preferred embodiment thereof in which:

Figure 1 is a plan view of the analyzer or analyzing gage showing two sets of gaging elements or members, one set of which analyzes a groove or part and a single indicator controlled thereby.

Figure 2 is a side elevation of the gage.

Figure 3 is an enlarged and fragmentary view of a screw thread and a portion of an analyzer gaging member or section engaging the root of the thread groove.

Figure 4 is an enlarged and fragmentary view of the screw thread and an analyzer gaging member or section engaging the thread groove at the pitch diameter.

Figure 5 is an enlarged and fragmentary view of the thread and an analyzer gaging member or section engaging the outer flank of the thread.

Figure 6 is an enlarged view of the sectional gaging roll.

Figure 7 is a section taken on line 7—7 of Figure 2.

The analyzer or gage is mounted on a frame 10 of any suitable construction, that illustrated being a triangular frame constructed to rest upon a bench and presenting the sets of gaging elements or members at an angle or inclined so that they are in more accessible position for the inspector.

The frame carries a slide 11, that shown being a groove in which is received a slide bar or carrier 12. Any suitable means may be used for retaining the slide bar in the groove that illustrated including screws 13 which pass through an elongated slot 14 in the slide bar. An adjustable stop 15 in the form of a screw limits the movement of the slide bar in one direction.

Means are provided to impel the slide bar or carrier 12 towards the stop which means includes a spring 18 which abuts against one end of the slide bar. The spring is retained in position by a pin 19 carried by a bracket adjustably mounted in the groove of the frame. Adjusting the position of the bracket will adjust the compression of the spring.

The analyzer carries two sets of gaging members or elements. One set tests for a plurality of defects in the groove or thread and the other set tests for general assembly-ability with a nut or threaded hole and lead. The combined test of both sets gives a comprehensive test of the thread and determines the defect which it may have.

The first set of gaging members includes a gaging member 23 pivotally mounted upon a pivot pin 24 carried by the frame. This pivoted gaging member forms a cradle or bearing to support a test part in position while at the same time serving as one of the gaging members. Any suitable cradle construction may be provided that illustrated having a concave gaging groove or portion 25, which may be inclined, if a thread groove is being tested so as to conform with the pitch of a thread, for receiving the part or thread to be tested which concave conformation centers the test part during the gaging operation. The pivot pin 24 is parallel to the axis of the cradle to swing the same to open position. Preferably the concave conformation has a diameter greater than the test part which in effect gives line contact yet performs the centering function. The concave gaging member pivots upwardly to open position to receive a test thread. The gaging member may be impelled to open position or may have a suitable friction drag applied thereto such as by a friction washer 26 so that the gaging member remains in the position to which it is moved as will appear more fully hereinafter. An adjustable stop 27 may be provided to limit the pivotal movement of the pivoted gaging member so that it is retained in or restrained at gaging position and does not pivot beyond this position.

A gaging member 30 cooperates with the concave gaging member or cradle 23 and is carried upon a pivot 31 which in turn is carried by an extension 32 forming a part of the carrier 12. The second gaging member comprises an analyzer member which may be in the form of a roll rotatably mounted upon the pivot 31. This pivot is preferably an eccentric one for adjustment of the position of the analyzer roll with respect to its cooperating gaging member 23 although either or both pivots may be adjustable. Any other adjusting means may be used. The analyzer roll has one or more gaging sections or segments, and in the illustrated embodiment one section is provided for each thread characteristic for which the part is to be tested. The analyzer roll illustrated has three sections: one section b gages the test piece for usable depth of thread, angle and the lower flank of the thread; another section c gages for pitch diameter; and the third section d tests the outer flank of the thread for angle and other thread deformities in this part of the thread. This engagement of the analyzer roll with a thread or groove such as a thread groove is shown in the enlarged views Figures 3, 4 and 5.

The gaging ridge or rib carried by the analyzer member or roll 30 tests a thread as to the three above enumerated characteristics by forming each rib section with a common pitch diameter. Preferably the ribs or ridges are in alignment with each other. This rib may be formed as a single rib around the entire periphery of the roll and then a portion of the rib is narrowed to a dimension approximating the width of a thread at the pitch diameter so that the portion of the rib remaining engages only the lower flank of the thread and extends into a test thread groove which is properly formed only as far as the specified usable depth. This is shown in Figure 3. The first section 30b of the rib will then engage this test thread from the point of permissible or usable depth to approximately the pitch diameter. The second section or segment 30c of the analyzer rib has a portion of the top removed and also portions of each side so that it is relatively thin though not as thin as the first section so that this analyzing rib engages the test thread a short distance on either side of the pitch line of the thread. The third section 30d has the top of the thread removed so that it engages the test thread from a point approximating the pitch diameter to the outer dimension of the thread under test. It will be noted therefore that a rib has a dimension less than the groove to be tested either in the width or the height or both in order to give a selective test.

The first section 30b of the gaging roll 30 will give, therefore, an indication as to the usable depth of the thread, as to whether or not the angle of the thread is proper at the root thereof, and any other thread deformity in the lower or root portion of the thread. The second section 30c will give a test for pitch diameter and thread deformities in the region of the pitch diameter without the other thread deformities affecting the same except as they may overlap. The third section 30d will test for correctness of the angle of the thread as well as any other thread deformity which may exist in the outer portion thereof. It is clear that a greater number as well as a fewer number of gaging sections may be provided depending upon the extent of test desired. The groove or particularly the thread groove is divided into sections and each gaging section tests a particular portion of the groove or test part.

Means may be utilized to frictionally maintain the analyzer roll in one of its sectional positions. This means may be of any desired form that illustrated including a spring pawl 35 engaging ratchet teeth 36 upon the roll. The ratchet means may also if desired, permit rotation of the analyzer roll in one direction only so that the sections are presented to the thread being tested in the sequence of sections b, c, and d.

Another set of gaging members is provided with the gage which set tests for lead although a form is preferred which tests for both general assembly-ability and lead. The gaging members 40 and 41 illustrated are members so constructed that they engage a plurality of points around the periphery of the test thread. In order to obtain a maximum peripheral engagement of a test part, each, preferably, has a concave gaging portion 42 and 43 and at least one gaging member is movable to permit the insertion of a test part within the gaging members. With concave gaging portions, the gaging members when in gaging position serve the function of a ring gage and give an equivalent test. The relative movement of one or both of the gaging members may be of any suitable kind although a pivotal movement is preferred. The member 40 is therefore carried upon a pivot 48 which in turn is carried by the frame. With pivoted gaging members, an adjustable stop such as the threaded stop 45 may be used to retain one of the pivoted gaging members in gaging position or to limit its movement to gaging position only.

The other gaging member 41 which cooperates with the gaging member 40 is mounted upon the slide bar or carrier 12 for movement therewith. This gaging member is mounted for pivotal movement on a pivot 44 carried by an extension 47 forming part of the slide bar. At least one of the pivots 48 and 44, and pivot 44 is so illustrated, is an eccentric pivot for adjusting the position of this gaging member with respect to the other.

The two gaging members may have means for retaining the same in open position or may be provided with frictional means such as friction washers 49 and 50 for retaining the respective gaging member in the position in which it is released. In other words when a test piece is to be inserted between the gaging members the latter are held in upward or open pivoted position. A test piece is inserted between the concave portions 42 and 43 thereof and the pressure thereof upon the gaging members pivots them into gaging position. After the test piece has been gaged it is withdrawn upwardly whereupon the gaging members remain in open position by the frictional means and are ready to receive the next test piece.

An indicator is mounted upon the frame and located so that its contact point or pin 54 engages a part of the movable gaging structure. In the illustrated construction the pin of the indicator engages the extension 47. With this construction a single indicator only is required to test the threads upon a test piece inserted in either pair or set of gaging members.

The gaging members 40 and 41 when in gaging position as illustrated constitutes a snap ring gage in that it gives a test for assembly-ability, comparable to the test of a ring gage in that the test piece is engaged approximately around the entire circumference of the test part. A small turn of the test part gives a full circumferential test. These gaging members also give a test for lead error. For example, suppose that a test part has been gaged in the first position as previously described and the thread is within the allowable tolerances. If now the test part in the second set of gaging members shows an indicator reading greater than the allowable tolerances, then the reading, except for an unusual condition, will be the result of a lead error. The reading also gives a measure of the lead error since the greater the lead error, the greater will be the indicator reading. In other words the lead error is proportional to the indicator reading. Reference to a previously prepared chart giving lead error as determined by the indicator reading would tell the inspector the extent of the error.

The analyzer gage described enables an inspector to determine just what fault or deformity may exist in a thread being tested so that selective separation of threaded parts may be made. This selective separation enables externally threaded parts to be assembled with like mating parts and hence saves many test parts which may otherwise be rejected. It also indicates which test parts have a defect which can be removed by reprocessing.

This invention is presented to fill a need for improvement in an analyzer gage. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A gage comprising a frame, a pair of cooperating gaging members mounted upon the frame adjacent each other, one of the gaging members having a plurality of gaging ribs forming a sectional gaging member, each rib being of a different form to detect a particular characteristic upon the test part, means mounting the sectional gaging member to bring each rib into gaging position, means pivotally mounting the other gaging member for movement into and out of gaging position, and a cradle gaging portion formed on the pivoted gaging member to receive the test part, and the pivotal mounting means being on an axis parallel to the cradle gaging portion to swing the same to open position.

2. A thread gage comprising a frame, a pair of cooperating gaging members mounted upon the frame adjacent each other, one of the gaging members having a plurality of gaging ribs in alignment with each other forming a sectional gaging member, each rib being of a different form to detect a particular thread characteristic, means mounting the sectional gaging member to bring each rib into gaging position, means pivotally mounting the other gaging member, a concave gaging portion carried by the pivotal gaging member, the pivotal mounting means being on an axis parallel to the concave gaging portion to swing the same to open position, and means to restrain the pivotal movement of the pivoted gaging member at gaging position.

3. A thread gage comprising a frame, a set of cooperating gaging members mounted upon the frame adjacent to each other, means pivotally mounting the cooperating gaging members upon spaced pivots, gaging means carried by at least one of the gaging members to engage a part to be tested at a plurality of points around its periphery, the pivot means for a gaging member having gaging means for peripheral engagement providing for movement thereof into and away from gaging position, means mounting the pivot means for one gaging member for movement towards and away from the other gaging member, and an indicator controlled by the movable gaging member.

4. A thread gage comprising a frame, a set of cooperating gaging members mounted upon the frame adjacent to each other, means pivotally mounting the cooperating gaging members upon spaced pivots for movement into and out of gaging position, a concave gaging portion carried by each gaging member, means mounting the pivotal means for one gaging member for movement relatively to the other, and an indicator controlled by the movable gaging member.

5. A thread gage comprising a frame, a set of cooperating gaging members mounted upon the frame adjacent to each other, means pivotally mounting the cooperating gaging members upon spaced pivots, gaging means carried by at least one of the gaging members to engage a part to be tested at a plurality of points around its periphery, the pivot means for a gaging member having gaging means for peripheral engagement providing for movement into and away from gaging position, means mounting the pivotal means for one gaging member for movement relatively to the other, means to restrain the pivotal movement of one of said gaging members at gaging position, and an indicator controlled by the movable gaging member.

6. A thread gage comprising a frame, a set of cooperating gaging members mounted upon the frame adjacent to each other, means pivotally mounting the cooperating gaging members upon spaced pivots for movement into and out of gaging position, a concave gaging portion carried by each gaging member, a bar slidably mounted in the frame and carrying the pivot means for one gaging member for movement thereof relatively to the other, and an indicator controlled by the movable gaging member.

PAUL W. JOHNSON.

REFERENCES CITED

The following references are of record in the file of this patent:

UNITED STATES PATENTS

| Number | Name | Date |
| --- | --- | --- |
| 1,337,018 | Lockey et al. | Apr. 13, 1920 |
| 2,027,217 | Zerkle | Jan. 7, 1936 |
| 1,621,526 | Culell | Mar. 22, 1927 |
| 1,679,189 | Wadell | July 31, 1928 |

FOREIGN PATENTS

| Number | Country | Date |
| --- | --- | --- |
| 36,936 | France | 1930 |
| | (Addition to No. 667,185) | |